(12) United States Patent
Kallay et al.

(10) Patent No.: US 8,840,317 B2
(45) Date of Patent: Sep. 23, 2014

(54) INTERLOCKING OPTICAL FIBER

(75) Inventors: Richard Kallay, Largo, FL (US); Scott G. Fleischman, Palmetto, FL (US)

(73) Assignee: Honeywell International Inc., Morristown, NJ (US)

( * ) Notice: Subject to any disclaimer, the term of this patent is extended or adjusted under 35 U.S.C. 154(b) by 693 days.

(21) Appl. No.: 13/086,490

(22) Filed: Apr. 14, 2011

(65) Prior Publication Data

US 2012/0263418 A1    Oct. 18, 2012

(51) Int. Cl.
- G02B 6/38 (2006.01)
- G02B 6/10 (2006.01)
- B29D 11/00 (2006.01)
- B29C 67/00 (2006.01)

(52) U.S. Cl.
CPC ................. B29D 11/00663 (2013.01)
USPC ............ 385/53; 385/128; 385/147; 264/1.24; 264/1.25; 425/383

(58) Field of Classification Search
USPC ........... 385/53, 100, 114, 115, 128, 134, 147; 264/1.24, 1.25, 1.28, 1.29, 165, 167; 427/162, 163.2; 174/117 F, 117 FF; 24/381, 403, 442; 425/383
See application file for complete search history.

(56) References Cited

U.S. PATENT DOCUMENTS

| | | |
|---|---|---|
| 2,528,667 A | 11/1950 | Raabe |
| 2,888,511 A | 5/1959 | Guritz |
| 3,877,912 A | 4/1975 | Shiraishi et al. |
| 5,113,036 A | 5/1992 | Arroyo et al. |
| 5,457,762 A | 10/1995 | Lochkovic et al. |
| 5,672,193 A | 9/1997 | Kohmura et al. |
| 5,732,173 A | 3/1998 | Bylander et al. |
| 5,845,026 A | 12/1998 | Lee et al. |
| 5,948,202 A | 9/1999 | Miller |
| 6,123,801 A | 9/2000 | Miller |
| 6,337,941 B1 | 1/2002 | Yang et al. |
| 6,799,383 B2 | 10/2004 | Wiley |
| 7,274,846 B1 | 9/2007 | Paap et al. |
| 7,572,065 B2 | 8/2009 | Lu et al. |
| 7,762,726 B2 | 7/2010 | Lu et al. |
| 7,811,272 B2 | 10/2010 | Lindsay et al. |
| 8,440,912 B1 * | 5/2013 | Kraus et al. ............. 174/117 FF |
| 2005/0180726 A1 * | 8/2005 | Carlson et al. ................ 385/147 |
| 2007/0133932 A1 * | 6/2007 | Kingsford et al. ........... 385/114 |
| 2009/0120664 A1 | 5/2009 | Clark et al. |
| 2009/0324881 A1 | 12/2009 | Takeuchi |
| 2011/0033156 A1 | 2/2011 | Sanghera et al. |

OTHER PUBLICATIONS

Responsive amendment, dated Dec. 17, 2012, for U.S. Appl. No. 12/948,172, 12 pages.
Response to the Office Action from co-pending U.S. Appl. No. 12/948,172, submitted for filing with the USPTO on Sep. 17, 2013, 12 pages.
Office Action dated Sep. 17, 2012 from U.S. Appl. No. 12/948,172, (10 pgs).
Office Action from co-pending U.S. Appl. No. 12/948,172, dated Oct. 25, 2013, 16 pp.

(Continued)

Primary Examiner — Uyen Chau N Le
Assistant Examiner — Michael Mooney
(74) Attorney, Agent, or Firm — Shumaker & Sieffert, P.A.

(57) ABSTRACT

An optical fiber includes an interlocking microstructure formed on an outer periphery of the fiber that configures the fiber to be interlocked with another optical fiber including a complementary interlocking microstructure coating.

16 Claims, 6 Drawing Sheets

(56) References Cited

OTHER PUBLICATIONS

Office Action from co-pending U.S. Appl. No. 12/948,172, dated Jun. 17, 2013, 11 pp.

Responsive amendment and RCE, dated Apr. 18, 2013, for co-pending U.S. Appl. No. 12/948,172, 15 pages.

Larsson, et al., "Improved Adhesion in Hybrid Si-Polymer MEMS Via Micromechanical Interlocking," Journal of Micromechanics and Microengineering, 15, pp. 2074-2082, 2005.

Reed et al., "Silicon Micro-Velcro," Advanced Materials, No. 1, pp. 48-51, 1992.

Office Action dated Feb. 5, 2013 from U.S. Appl. No. 12/948,172, (12 pgs).

* cited by examiner

INTERLOCKING OPTICAL FIBER

TECHNICAL FIELD

This disclosure relates to optical fibers.

BACKGROUND

Communications, data transmission, and various other systems that transmit information can employ a plurality of optical fibers, due to, at least in part, their signal transmission capabilities, which greatly exceed those of some electrical conductors. For example, signals may travel along optical fibers with less loss compared to electrical conductors, and optical fibers can also be immune to electromagnetic interference.

SUMMARY

In general, this disclosure is directed to optical fibers, and methods related thereto, which include an interlocking microstructure formed on an outer periphery of the optical fiber that configures the optical fiber to be interlocked with another optical fiber including a complementary interlocking microstructure.

In one example, a method includes drawing a first optical fiber from a preform, and forming an interlocking microstructure on an outer periphery of the first optical fiber that configures the first optical fiber to be interlocked with a second optical fiber comprising a complementary interlocking microstructure.

In another example, an assembly includes an optical fiber comprising an interlocking microstructure formed on an outer periphery of the optical fiber that configures the optical fiber to be interlocked with another optical fiber comprising a complementary interlocking microstructure coating.

In another example, a system for manufacturing optical fibers includes a preform from which an optical fiber is configured to be drawn and a micromachining apparatus. The micromachining apparatus is configured to form an interlocking microstructure on an outer periphery of the optical fiber that configures the optical fiber to be interlocked with another optical fiber comprising a complementary interlocking microstructure.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-H are schematic diagrams of profile shapes for a number of example protrusions that may define interlocking microstructures according to this disclosure.

DETAILED DESCRIPTION

Figure 1:
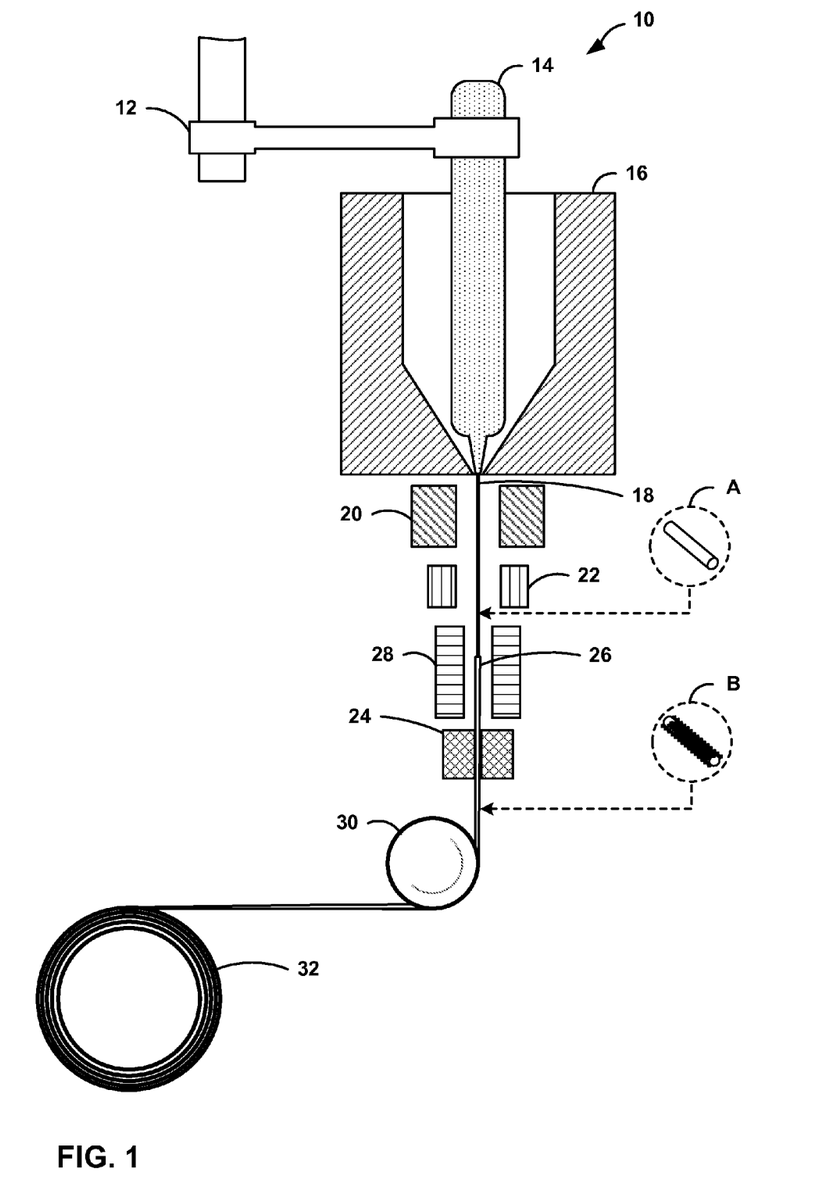
FIG. 1 is a schematic diagram of an example optical fiber drawing tower configured to fabricate optical fibers including an interlocking shape.

FIG. 1 is a schematic diagram of example optical fiber drawing tower 10 including feed arm 12, preform 14, draw furnace 16, optical fiber 18, core monitor 20, coating applicator 22, micromachining apparatus 24, curing equipment 28, tractor belt 30, and take-up drum 32. Drawing tower 10 is configured to produce coated optical fiber 26. In the example shown in FIG. 1, tractor belt 30 draws optical fiber 18, which may include a fiber core and cladding, from preform 14 and winds up the fiber on take-up drum 32. Between draw furnace 16 and tractor belt 30, fiber 18 is coated by coating applicator 22 to form coated fiber 26, which includes a fiber core, cladding, and coating. Micromachining apparatus 24 applies an interlocking microstructure to coated fiber 26, which configures the fiber to interlock with other fibers with a complementary interlocking microstructure.

In some optical fiber applications, a number of optical fibers are coupled to one another to form an array of side-by-side fibers. The manner in which the fibers have been mechanically coupled to form such arrays in the past has included adhering adjacent fibers to one another and adhering a number of fibers to some kind of substrate or backing sheet. Although optical fibers offer a number of significant advantages in various information transmission applications, their manufacture and assembly may still present difficulties that may increase the cost and complexity of realizing such gains in practice. Improvements on these more costly and complex past processes for coupling multiple optical fibers have been made. In one example described in commonly assigned application Ser. No. 12/948,172, filed Nov. 17, 2010, and entitled "INTERLOCKING OPTICAL FIBER," the outer periphery of an optical fiber is formed in a shape that configures the fiber to interlock with other fibers with a complementary shape. For example, according to the disclosure of application Ser. No. 12/948,172, the outer periphery of an optical fiber may be formed in a tongue and groove shape such that one optical fiber may be interlocked to another optical fiber by receiving the tongue of the first optical fiber in a groove of the second optical fiber or vice versa. The entire content of application Ser. No. 12/948,172 is incorporated herein by this reference.

Examples according to this disclosure achieve a similar type of mechanical interlock between multiple optical fibers as described in application Ser. No. 12/948,172, but in a different manner and using a different structure for mechanically coupling the fibers. In particular, the following examples include applying an interlocking microstructure to the outer periphery of an optical fiber that configures the optical fiber to be interlocked with another optical fiber including a complementary interlocking microstructure. An interlocking microstructure may include, e.g., a number of protrusions extending outward from the outer periphery of an optical fiber that are configured to interlock with complementary protrusions or other microstructures on another optical fiber. The geometry of the coating and the optical fiber may remain relatively unchanged in order to define the interlocking features, in contrast to some example optical fibers described in application Ser. No. 12/948,172. In some examples, the interlocking microstructures are distributed substantially evenly around an entire outer periphery of the optical fiber. In this way, optical fibers with mating interlocking microstructures may be interlocked together without requiring the fibers to be in a specific orientation relative to each other. This may help improve the ease with which optical fibers are interlocked together.

In some examples, "microstructure" may refer to surface features on the outer periphery of an optical fiber that may not be visible to the naked eye and that are on a scale that is at least an order of magnitude smaller than the major dimensions of the fiber on which they are applied. For example, an optical fiber according to this disclosure may have a diameter on the order of approximately 125 microns (μm), while an interlocking microstructure formed on the outer periphery of the fiber may include a number of protrusions that extend from the outer periphery of the optical fiber by a distance that is in a range from approximately 4 to approximately 15 microns (μm).

Example interlocking microstructures applied to the outer periphery of an optical fiber according to this disclosure may include mushroom shaped, barbed, or hook shaped protrusions distributed over the outer periphery of the fiber that are configured to interlock with similar or complementary protrusions on another fiber. In one example, mushroom shaped protrusions on two different fibers interlock within one another. The "mushroom" shaped microstructure may include a stalk with a truncated pyramid or frustrom shaped head protruding from the stalk. In another example, a hook shaped protrusion on one fiber interlocks with a loop shaped protrusion on another optical fiber.

Optical fibers according to this disclosure may be interlocked with one another to form optical fiber assemblies, which can include one-dimensional and multi-dimensional arrays of optical fibers. In some examples, interlocking fibers according to this disclosure may be assembled with satisfactory mechanical stability such that additional materials and processing steps, such as applying an adhesive may not be necessary.

As illustrated in the example of FIG. 1, optical fiber 18 is fabricated from preform 14. In some examples, a preform can be a cylinder of silica composition that may consist of a core surrounded by a cladding with a particular refractive-index profile, attenuation, and other target characteristics for the optical fiber produced from the preform. In other words, the preform may emulate the optical fiber that is produced from the preform, but on a larger scale. For example, preform 14 may have a diameter in a range from approximately 10 to approximately 25 millimeters and a length in a range from approximately 60 to approximately 120 centimeters. Optical fiber 18 drawn from preform 14, however, may have a diameter on the order of approximately 125 microns (μm). Other preform and optical fiber dimensions are contemplated.

There are a number of different methods that may be employed to produce preform 14, including, but not limited to: Internal Deposition, where material is grown inside a tube; Outside Deposition, where material is deposited on a mandrel, which can be removed in a later stage; and Axial Deposition, where material is deposited axially, directly on a glass preform. In some examples, preform 14 is fabricated by vapor-phase oxidation, in which a number of gases, e.g., silicon tetrachloride ($SiCl_4$) and oxygen ($O_2$), are mixed at a relatively high temperature to produce a material, e.g., silicon dioxide ($SiO_2$), which is deposited layer-upon-layer to build up the preform core.

Silicon dioxide, pure silica, or other materials forming the core of preform 14 may be in the form of small particles (e.g., on the order of about 0.1 μm), which can be referred to as "soot." This soot may be deposited on a starting rod or tube in a deposition process. In some examples, the soot for the core material of preform 14 is made by mixing three gases: $SiCl_4$, germanium tetrachloride ($GeCl_4$), and $O_2$, which results in a mixture of $SiO_2$ and germanium dioxide ($GeO_2$). The degree of doping of the core may be controlled by changing the amount of $GeCl_4$ gas added to the mixture. The deposition of silica soot, layer upon layer, may also act to form a homogeneous transparent cladding material. In some examples, various dopants may be employed to change the value of a cladding's refractive index. For example, fluorine (F) may be used to decrease the cladding's refractive index in a depressed-cladding configuration. Thus, in some examples, preform 14 may be comprised of two generally concentric glass structures: the core, which is configured to carry light signals, and the cladding, which is configured to trap the light in the core.

In one example, preform 14 is produced by Modified Chemical Vapor Deposition (MCVD), which is a type of Internal Deposition. MCVD is a process for fabricating preforms in which the preform core material is deposited on the inside surface of a starting tube. For example, individual layers of deposited material may be vitrified, i.e., turned into glass by a torch that moves back and forth along the length of the starting tube. Material deposition may occur as the torch assembly slowly traverses the length of the starting tube, while reactant gasses are pumped into and exhausted from the tube. Following the deposition of core material and some cladding material, the starting tube may be collapsed to form a solid rod by heating the tube to a higher temperature than during deposition. The silica glass starting tube may thus become part of the cladding of preform 14. In one example, the cladding of preform 14 may be further increased by an overcladding (also referred to as sleeving or overcollapse) process, during which another silica tube is collapsed on the outside of the original preform, thereby increasing the geometrical dimensions of preform 14.

Regardless of the particular configuration or method of manufacturing preform 14, in drawing tower 10 of FIG. 1, feed arm 12 positions preform 14 within draw furnace 16, which may heat the tip of the preform in preparation for drawing optical fiber 18. Feed arm 12 may be part of a number of different types of partially or completely automated material positioning machines, including, e.g., robotics equipment or other computer controlled machinery including, e.g., machines operated using a programmable logic controller (PLC).

To begin drawing optical fiber 18, preform 14 is lowered into and heated within draw furnace 16. In one example, draw furnace 16 may include a high-purity graphite furnace. After preform 14 is positioned within draw furnace 16 by feed arm 12, in one example, gasses may be injected into the furnace to provide a relatively clean and conductive atmosphere. In furnace 16, preform 14 is heated to a temperature that produces a desired drawing tension in optical fiber 18. In one example, preform 14 is heated to temperatures approaching approximately 1600° C. (approximately 3000° F.) to soften the tip of the preform. In any event, the tip of preform 14 may be heated until a piece of molten glass, referred to as a gob, begins to fall from the preform, much like hot taffy. As gravity causes the gob to fall from preform 14, it pulls behind it a thin strand of glass, which forms the beginning of optical fiber 18.

In one example, the gob from preform 14 may be cut off, and the beginning of optical fiber 18 may be threaded through core monitor 20, coating applicator 22, curing equipment 28, and micromachining apparatus 24 to tractor belt 30. As the tip of preform 14 continues to be heated within draw furnace 16, tractor 30 draws optical fiber 18 from the preform through the equipment of drawing tower 10 and winds the fiber around take-up drum 32. Drawing tower 10 may, in one example, draw optical fiber 18 at speeds in a range from approximately 10 to approximately 20 meters per second, although other speeds can be used in other examples.

During the draw process, the dimensions of optical fiber 18 may be monitored and controlled using core monitor 20. In one example, core monitor includes a laser-based diameter gauge configured to monitor the diameter of optical fiber 18. Employing core monitor 20, the diameter of optical fiber 18 may, in some examples, be controlled to, e.g., 125 microns within a tolerance of 1 micron, although optical fiber 18 can have other dimensions in other examples. In operation, core monitor 20 may sample the diameter of optical fiber 18 at relatively high frequencies, e.g., in excess of 750 Hertz (Hz). The value of the diameter of optical fiber 18 measured by core monitor 20 may be compared to a target diameter, e.g., 125 microns. A processor controlling all or part of the operation of drawing tower 10 can convert deviations from the target diameter into changes in draw speeds, and may control tractor belt 30 to adjust the draw speed for optical fiber 18 through draw tower 10. For example, if core monitor 20 determines that the diameter of optical fiber 18 has increased above its target, tractor belt 30 may increase the drawing speed. If, on the other hand, core monitor 20 determines that the diameter of optical fiber 18 has fallen below the target, tractor belt 30 may decrease the drawing speed.

Processors in examples according to this disclosure may include any one or more of a microprocessor, a controller, a digital signal processor (DSP), an application specific integrated circuit (ASIC), a field-programmable gate array (FPGA), or equivalent discrete or integrated logic circuitry. The functions attributed to such processors in this disclosure may be embodied as software, firmware, hardware and combinations thereof. Additionally, in some examples one processor may be employed, while in other examples multiple processors that are configured to execute one or more functions individually or in different cooperative combinations may be employed.

After exiting core monitor 20, optical fiber 18 enters coating applicator 22, in which a protective coating may be applied to the fiber to form coated fiber 26. In some examples, coating applicator 22 may apply multiple coatings to optical fiber 18. For example, coating applicator 22 may apply a two layer protective coating including a soft inner coating and a hard outer coating. The protective coating, however many layers, may act to provide mechanical protection for handling optical fiber 18 and also protecting the highly finished surface of the fiber from harsh environments. Coating applicator 22 may apply various types of coatings to optical fiber 18 to form coated fiber 26, such as various ultra-violate curable urethane acrylate coatings. Coatings applied to optical fiber 18 by applicator 22 may be cured by curing equipment 28, which may include, e.g., a furnace or UV lamps.

In some examples, optical fiber 18 drawn from preform 14 may have a generally round cross-sectional shape and, thus, may define an elongated cylinder after being drawn from drawing tower 10. For example, optical fiber 18 may have a generally circular cross-sectional shape such that the drawn fiber forms a generally circular elongated cylinder. In another example, optical fiber 18 may have a generally oval cross-sectional shape such that the drawn fiber forms a generally oval elongated cylinder. The shape of optical fiber 18 may be configured to enhance the optical and environmental performance of the fiber, while having little to no impact on other factors such as the manufacturing processes or mechanical stability of optical fiber assemblies.

The coating applied to optical fiber 18 by coating applicator 22 may generally assume the shape of the optical fiber such that, without further processing, an outer periphery of coated fiber 26 would be formed in generally the same shape as the outer periphery of optical fiber 18. The shape, as well as surface characteristics of the coating applied to optical fiber 18 may have little to no impact on the optical and environmental performance of the fiber. Example coated fibers 26 and methods according to this disclosure may improve the manufacturing process and mechanical stability of optical fiber assemblies by applying an interlocking microstructure to the outer periphery of the coated fiber. In the example of FIG. 1, the coated fiber 26 is drawn through micromachining apparatus 24, which is configured to form an interlocking microstructure on the outer periphery of the coated fiber that configures the fiber to be interlocked with other fibers comprising a complementary interlocking microstructure.

Micromachining apparatus 24 may include a number of different devices configured to form (or apply) microstructures on surfaces of optical fibers, e.g. by growing, etching, and/or cutting the microstructures on or into the surface of the fibers. In one example, micromachining apparatus 24 includes a micromachining device similar to those employed in the fabrication of semiconductor wafers. For example, micromachining apparatus 24 may be configured to form interlocking microstructures on the outer periphery of coated fiber 26 by a combination of growing, masking, and etching layers of material on the surface of the fiber.

In one example, a silicon oxide ($SiO_2$) layer is grown at approximately 1000° C. (e.g., in a controlled environment having a temperature of about 1000° C.) in dry oxygen on the outer surface of coated fiber 26 in micromachining apparatus 24. The initial layer of $SiO_2$ may be on the order of 0.12 microns thick. In this example, micromachining apparatus 24 patterns the oxide into an array of small (about 10 microns) square islands with a mask. After photoresist stripping the masked oxide, micromachining apparatus 24 may immerse coated fiber 26 in an anisotropic etch bath including, for example, aqueous potassium hydroxide (KOH) and isopropyl alcohol. The photoresist stripping and etching by micromachining apparatus 24 may result in forming the head of a microstructure according to this disclosure, e.g., truncated pyramid or frustrum shaped head approximately 5 microns high on the outer surface of coated fiber 26.

After forming the heads of an array of interlocking microstructures on coated fiber 26, micromachining apparatus may, in one example, continue the process by forming stalks on the outer periphery of the coated fiber from which the heads will extend. In one example, micromachining apparatus 24 may grow another $SiO_2$ layer on coated fiber 26 at approximately 1000° C. in dry oxygen in wet oxygen. The second layer may be thicker than the first and, in one example, may be approximately 1-approximately 1.5 microns thick. Micromachining apparatus 24 may then pattern the oxide by a second mask, the configuration of which may be aligned to the array of frustrom shaped heads. After photoresist stripping the oxide, micromachining apparatus 24 may etch the $SiO_2$ layer in KOH which removes some of the underlying silicon and produces the stalks from which the heads of the interlocking microstructures on the outer surface of coated fiber 26 extend.

Figure 2A:
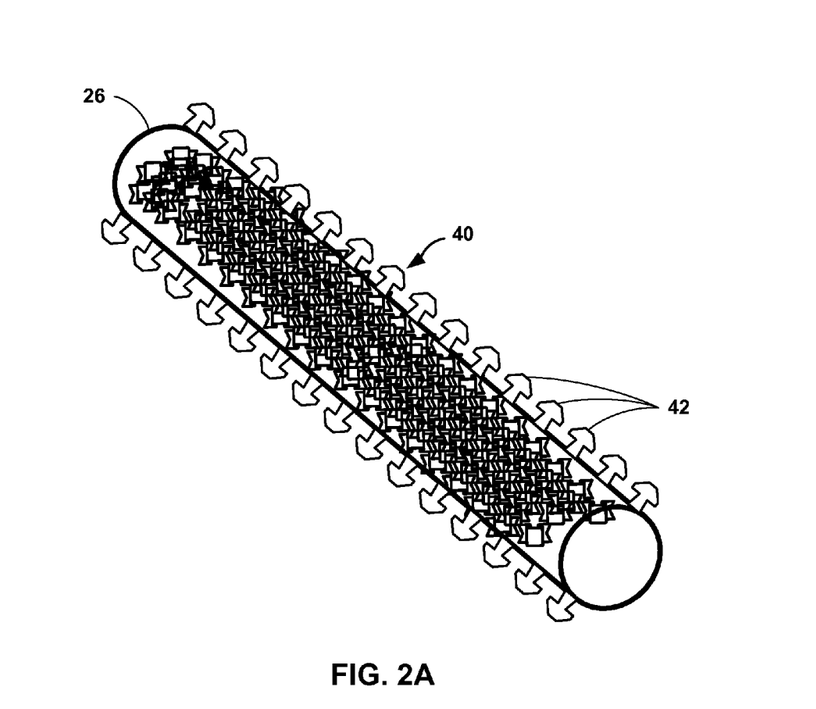
FIG. 2A is a schematic diagram of coated fiber including an interlocking microstructure that may be formed in the drawing tower of FIG. 1.

After emerging from micromachining apparatus 24, in one example, coated fiber 26 may include an interlocking microstructure on the outer surface of the fiber that includes an array of mushroom shaped protrusions, each of which includes a stalk protruding out from the surface of the fiber and a frustrom shaped head extending from the stalk. FIG. 2A is a schematic diagram of coated fiber 26 including interlocking microstructure 40 including an array of mushroom shaped protrusions 42 formed on the outer periphery of the fiber by micromachining apparatus 24. In some examples, protrusions 42 of interlocking microstructures 40 are distributed substantially around the entire outer periphery of optical fiber 26. The density of protrusions 42 on the outer periphery of coated fiber 26 may be substantially even or vary in different portions of the periphery. In any event, in this way, optical fiber 26 may be interlocked with one or more other fibers with complementary interlocking microstructures without requiring the fibers to be in a specific orientation relative to each other. This may help improve the ease with which optical fibers according to this disclosure are interlocked together and thereby combined to form optical fiber assemblies.

Figure 2B:
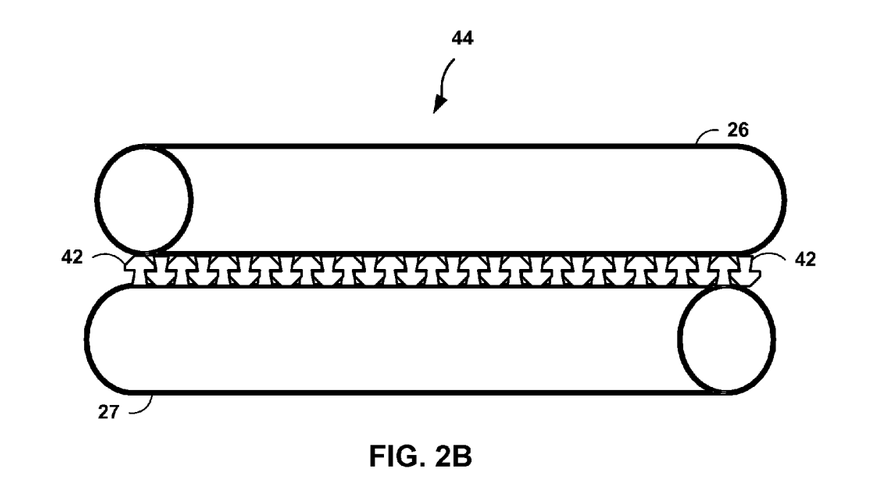
FIG. 2B is a schematic diagram of two interlocking optical fibers according to the example of FIG. 2A forming an optical fiber assembly.

FIG. 2B is a schematic diagram of two interlocking optical fibers 26 forming optical fiber assembly 44. In FIG. 2B, coated fibers 26 and 27 include an interlocking microstructure similar to microstructure 40 described with reference FIGS. 1 and 2A, each of which includes an array of mushroom shaped protrusions 42 extending from the outer surface of the respective fibers. Optical fiber assembly 44 is formed by interlocking two coated fibers 26 and 27 to one another. In the example of FIG. 2B, optical fibers 26 and 27 are mechanically coupled, i.e. interlocked by arranging the frustrom shaped heads of protrusions 42 on optical fiber 26 to engage the stalks of protrusions 42 on optical fiber 27 and arranging the frustrom shaped heads of protrusions 42 on optical fiber 27 to engage the stalks of protrusions 42 on optical fiber 26.

Interlocking microstructures, including, e.g., microstructure 40 including mushroom shaped protrusions 42 of FIGS. 2A and 2B may be fabricated in a range of sizes and areal densities on the outer periphery of optical fibers according to this disclosure. In one example, interlocking microstructures formed on the outer periphery of an optical fiber may include a width, e.g. a width of the head of a mushroom shaped protrusion in a range from approximately 4 to approximately 18 microns and a height, or distance protruding from the outer periphery of the fiber, e.g. a distance the stalk and the head of the mushroom shaped protrusion extends from the outer periphery of the fiber in a range from approximately 4 to approximately 15 microns. In one example, an array of protrusions forming an interlocking microstructure according to this disclosure may have an areal density on the outer periphery of an optical fiber in a range from approximately 190,000 to approximately 210,000 protrusions per square centimeter.

Optical fiber assembly 44 shown in FIG. 2B is an example of an array of optical fibers formed by interlocking a number of fibers with the same interlocking microstructures shapes to one another. In particular, optical fiber assembly 44 illustrates a one-dimensional array of fibers. That is, fiber 26 is interlocked with adjacent fiber 27 in substantially one direction, which, in the example shown in FIG. 2B, is a direction substantially orthogonal to the longitudinal axes of the fibers. However, in other examples, optical fibers including interlocking microstructures according to this disclosure may be joined in arrays of fibers to form multi-dimensional assemblies, including, e.g., two-dimensional optical fiber assemblies.

Figure 3A:
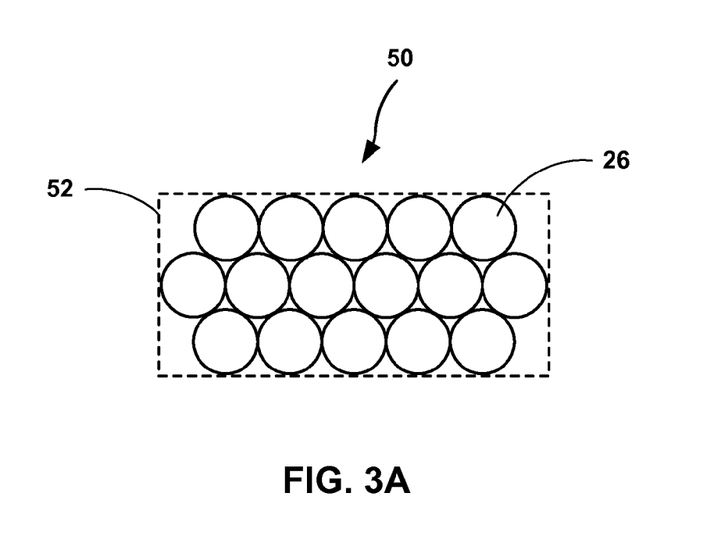
FIGS. 3A and 3B are schematic cross-section views of two different example two-dimensional optical fiber assemblies including an array of with interlocking microstructures according to this disclosure.
Figure 3B:
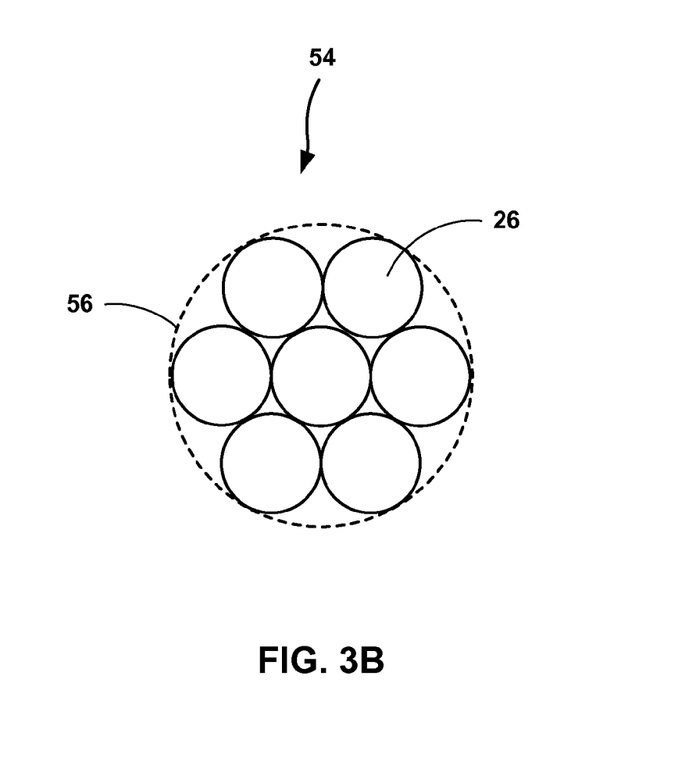

FIGS. 3A and 3B are schematic cross-section views of two different example two-dimensional optical fiber assemblies including an array of interlocking microstructures according to this disclosure. For example, FIG. 3A is a schematic cross-sectional view of optical fiber assembly 50 in the form of a two-dimensional array of three rows of interlocked optical fibers 26, which each include an interlocking microstructure formed on an outer peripheral of the fiber (not shown in FIGS. 3A and 3B for the sake of simplicity). That is, fibers 26 are interlocked with one another in two directions, which, in the example shown in FIG. 3A, are two directions substantially orthogonal to one another and to longitudinal axes of the fibers. In the example shown in FIG. 3A, fibers 26 are arranged such that their longitudinal axes are substantially parallel to each other.

Fiber assembly 50 of FIG. 3A forms a generally rectangular profile shape as illustrated by bounding box 52 in FIG. 3A. Another two-dimensional optical fiber assembly 54 is illustrated in FIG. 3B. Optical fiber assembly 54 may be configured similarly to assembly 50 of FIG. 3A. For example, fibers 26 of assembly 54 may be interlocked with one another via interlocking microstructures in two directions, which, in the example shown in FIG. 3B, as with assembly 50 of FIG. 3A, are two directions substantially orthogonal to one another and to longitudinal s of the fibers. Fiber assembly 54 of FIG. 3B, in contrast to assembly 50 of FIG. 3A, forms a generally circular profile shape as illustrated by bounding circle 56 circumscribing assembly 54 in FIG. 3B. The examples of FIGS. 3A and 3B are illustrative only and many other assembly configurations as possible employing optical fibers with interlocking microstructures according to this disclosure.

As illustrated by the optical fiber assemblies 50 and 54 of FIGS. 3A and 3B, respectively, interlocking microstructures formed on optical fibers according to this disclosure may be configured to interlock multiple fibers to limit movement, including translation and rotation, of fibers relative to each other in a number of directions. In some examples, assemblies including multiple optical fibers according to this disclosure are arranged such that the fibers are completely fixed from movement relative to each other such that the interlocking microstructures formed on the fibers limit movement in all six directions, including 3 directions of translation, e.g. x, y, z directions and 3 directions of rotation, e.g. pitch, yaw, and roll. In this manner, interlocking microstructures according to this disclosure may function to produce a zero degree of freedom coupling between multiple optical fibers.

Referring again to FIG. 1, although micromachining apparatus 24 is described above as growing and etching an interlocking microstructure on the outer surface of coated fiber 26, in another example, the device may, e.g., cut the microstructures into the fiber. In one example, micromachining apparatus 24 may include an excimer laser that is configured to cut an interlocking microstructure into the outer periphery of coated fiber 26 after it is cured in curing equipment 28. An excimer laser, sometimes referred to as an exciplex laser, is an ultraviolet laser used in the fabrication of microelectronic devices, including integrated circuits. An excimer laser may employ a combination of a noble gas, e.g., argon, krypton, or xenon, and a reactive gas, e.g., fluorine or chlorine. Under the appropriate conditions of electrical stimulation and high pressure, a pseudo-molecule called an excimer, or in some cases, an exciplex, is created, which can only exist in an energized state and can give rise to laser light in the ultraviolet range. Some excimer lasers employ deep ultraviolet (DUV) light from the krypton-flourine (KrF) and argon-flourin (ArF) excimer lasers with wavelengths of approximately 248 and 193 nanometers, respectively. Such lasers have enabled fabrication of features with sizes less than approximately 50 nanometers. In one example, micromachining apparatus 24 includes an excimer laser that is configured to cut an interlocking microstructure, e.g., microstructure 40 including an array of mushroom shaped protrusions 42, into the outer surface of coated fiber 26 after the fiber has been cured in curing equipment 28. After fiber 26 has been cured in curing equipment 28, fiber 26 is substantially hardened in some examples.

Figure 4A:
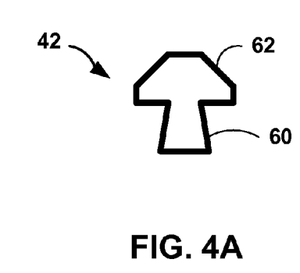
Figure 4B:
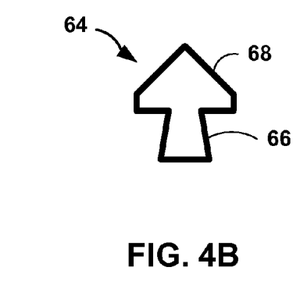
Figure 4C:
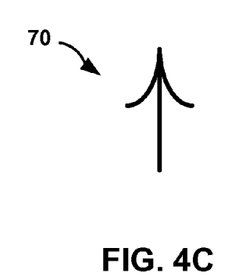
Figure 4D:
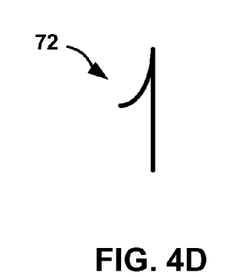
Figure 4E:
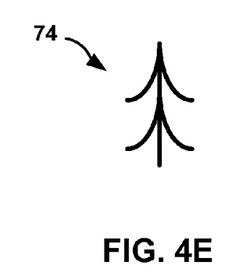
Figure 4F:
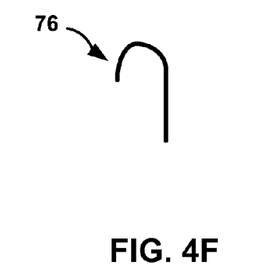
Figure 4G:
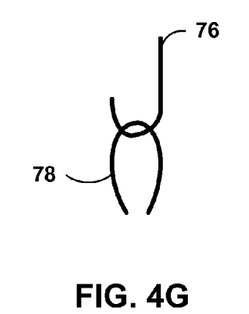
Figure 4H:
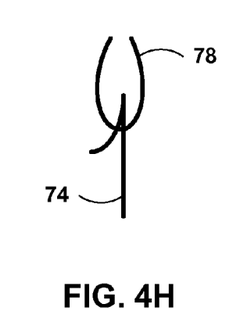

Although mushroom shaped protrusions are described above with reference to FIGS. 1-2B as forming the example interlocking microstructure on coated fiber 26, other microstructures may be employed in examples according to this disclosure. FIGS. 4A-4H are schematic diagrams of profile shapes for a number of example protrusions that may comprise interlocking microstructures according to this disclosure. Protrusion 42 described above is illustrated in FIG. 4A and includes stalk 60 and frustrom shaped head 62. A slight variation on protrusion 42 is illustrated in FIG. 4B, which includes protrusion 64 including stalk 66 and an untruncated pyramid shaped head 68. FIGS. 4C-4E illustrate a number of different barbed shaped protrusions that may be employed in interlocking microstructures according to this disclosure, while FIGS. 4F-4H illustrate a number of examples employing hook shaped protrusions.

In the examples of FIGS. 4G and 4H, a hook and loop and barb and loop interlock is respectively illustrated. The examples of FIGS. 4G and 4H illustrate examples in which two interlocking microstructures are coupled that have complementary, but not the same, shape. In the example of FIG. 4G, hook protrusion 76, e.g., formed on the outer periphery of a first optical fiber, is interlocked with complementary loop protrusion 78, e.g., formed on the outer periphery of a second optical fiber, to interlock the first fiber to the second. Similarly, in the example of FIG. 4H, barb protrusion 74, e.g., formed on the outer periphery of a first optical fiber, is interlocked with complementary loop protrusion 78, e.g., formed on the outer periphery of a second optical fiber, to interlock the first fiber to the second. The example shapes and interlocks of FIGS. 4A-4H are illustrative only and many other interlocking microstructures configurations may be formed on optical fibers according to this disclosure.

Figure 5:
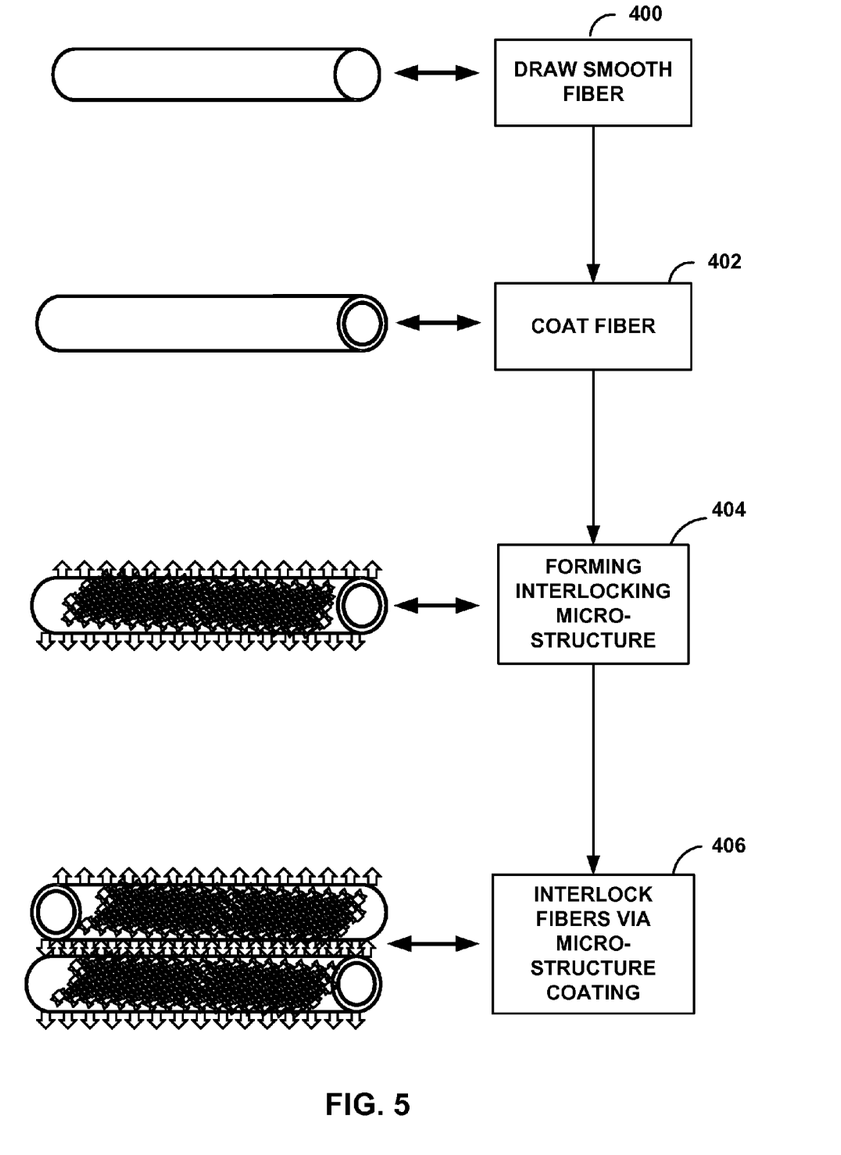
FIG. 5 is a flowchart illustrating an example method of fabricating an optical fiber.

FIG. 5 is a flowchart illustrating an example method of fabricating an optical fiber in accordance with this disclosure. The method of FIG. 5 includes drawing an optical fiber from a preform (400), applying a coating to the fiber (402), forming an interlocking microstructure on an outer periphery of the optical fiber that configures it to be interlocked with another fiber including a complementary interlocking microstructure (404), and interlocking a number of fibers with complementary microstructures to form an optical fiber assembly (406). The steps of the method of FIG. 5 for fabricating an optical fiber are described below as carried out using drawing tower 10 of FIG. 1 for purposes of illustration only. In other examples, one or more aspects of the method of FIG. 5 may be carried out by devices or systems that differ from the example of FIG. 1 in constitution and arrangement. For example, as will be illustrated with reference to the alternative example drawing tower illustrated in FIG. 6, a micromachining apparatus may form the interlocking microstructure on the outer periphery of an optical fiber after the fiber has been fabricated in a drawing tower, e.g., in a separate process and/or including fabrication machinery separate from the drawing tower.

The example method of FIG. 5 includes drawing an optical fiber from a preform (400). In one example, feed arm 12 of drawing tower 10 positions preform 14 within draw furnace 16, which may heat the tip of the preform in preparation for drawing optical fiber 18. To begin drawing optical fiber 18, preform 14 is heated in furnace 16 to a temperature that produces a desired drawing tension in optical fiber 18. In one example, preform 14 may be heated to temperatures approaching approximately 1600° C. (approximately 3000° F.) to soften the tip of the preform. In any event, the tip of preform 14 may be heated until a piece of molten glass, referred to as a gob, begins to fall from the preform. As gravity causes the gob to fall from preform 14, it pulls behind it a thin strand of glass, which forms the beginning of optical fiber 18. The gob from preform 14 may be cut off, and the beginning of optical fiber 18 may be threaded through core monitor 20, coating applicator 22, die 24, and curing equipment 28 to tractor belt 30 and wound around take-up drum 32.

The method of FIG. 5 also includes applying a coating to the optical fiber drawn from the preform (402). In one example, optical fiber 18 may be drawn through coating applicator 22 of drawing tower 10, which applies a protective coating to the outer surface of the fiber to form coated fiber 26. In some examples, coating applicator 22 may apply multiple coatings to optical fiber 18. The protective coating, however many layers, may act to provide mechanical protection for handling optical fiber 18 and also protect the finely finished surface of the fiber from harsh environments.

In addition to applying a coating to the optical fiber drawn from the preform (402), the method of FIG. 5 includes forming an interlocking microstructure on the outer periphery of the coated optical fiber (404). In one example, the microstructure on the outer periphery of coated fiber 26 is formed by micromachining apparatus 24, which forms the microstructure on the coated fiber after the coating is cured in curing equipment 28, as illustrated and described with reference to the example of FIG. 1. In other examples, the interlocking microstructure that configures the coated fiber to be interlocked with another fiber including a complementary interlocking microstructure may be formed on the outer periphery of the fiber in other ways than illustrated in the example of FIG. 1.

Figure 6:
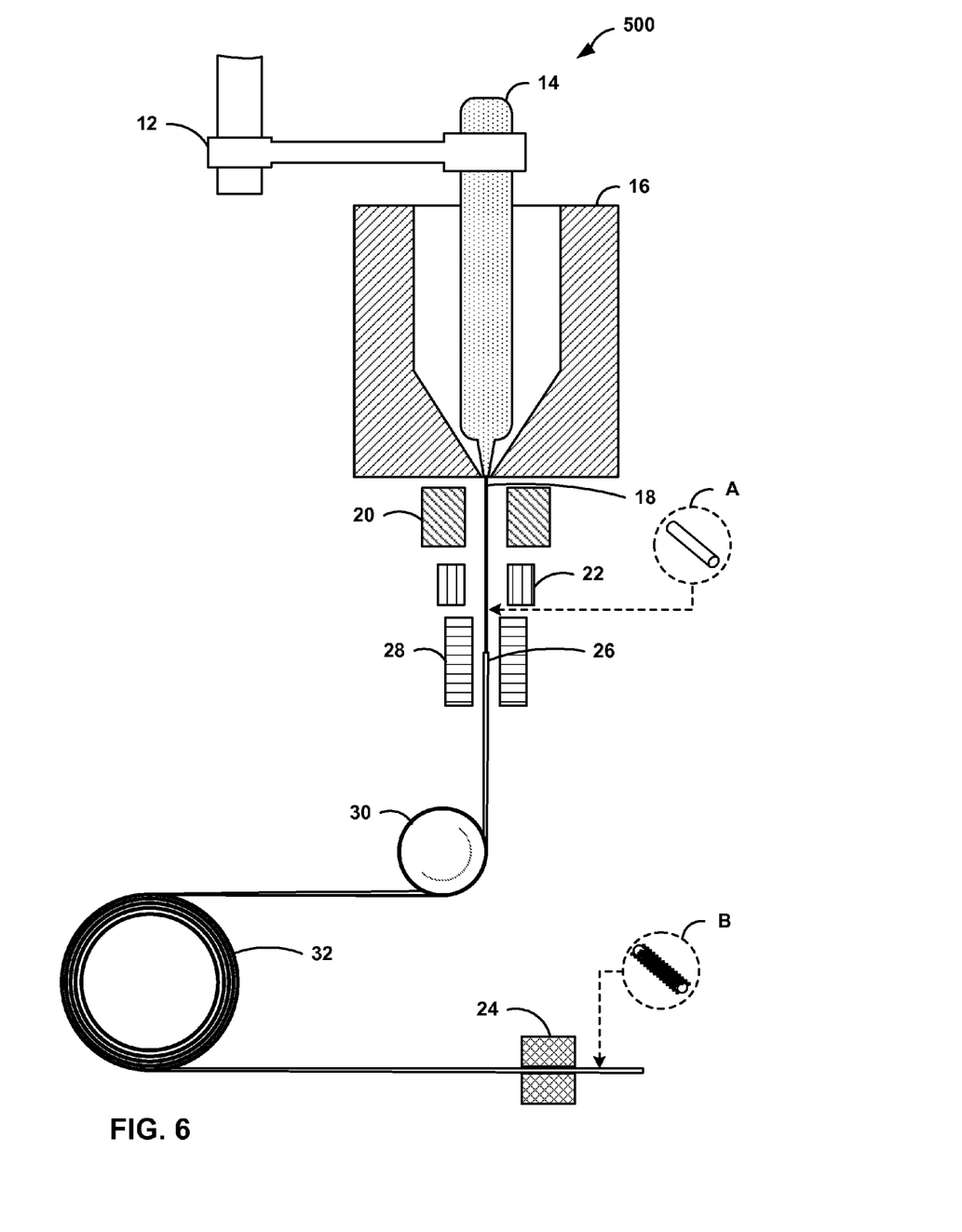
FIG. 6 is a schematic diagram of another example optical fiber drawing tower configured to fabricate optical fibers including an interlocking shape.

For example, FIG. 6 is a block diagram illustrating example optical fiber drawing tower 500 including feed arm 12, preform 14, draw furnace 16, optical fiber 18, core monitor 20, coating applicator 22, micromachining apparatus 24, coated fiber 26, curing equipment 28, tractor belt 30, and take-up drum 32. Drawing tower 500 of FIG. 6 may be configured and operate similar to tower 10 described in FIG. 1, including the same components as the example of FIG. 1. Unlike drawing tower 10 of FIG. 1, however, micromachining apparatus 24 is arranged after drawing tower 500 has fabricated coated fiber 26 and, in one example, coiled the completed fiber on take-up drum 32.

In one example, micromachining apparatus 24 may be configured to a component of drawing tower 500 or a component of the same fabrication process under which the tower operates, but, instead of being arranged before coated fiber 26 is wound up on take-up drum 32 as in the example of FIG. 1, micromachining apparatus 24 in the example of FIG. 6 is arranged after the take-up drum. This may help limit fixation of fiber 26 to itself on take-up drum 32 via microstructures formed on the outer surface of fiber 26. In another example, micromachining apparatus 24 may form the microstructure on coated fiber 26 as a separate process from and including separate fabrication machinery from drawing tower 500. For example, micromachining apparatus 24 may be completely separate from drawing tower 500 downstream from the initial fabrication of coated fiber 26.

Although the foregoing examples describe forming interlocking microstructure on the outer periphery of the coating of an optical fiber, in some examples according to this disclosure, the interlocking microstructure may be formed on the outer periphery of the optical fiber itself and the coating may overlay the fiber including the microstructure. As noted above, and is the case in the foregoing specific examples, an optical fiber drawn from a preform 14 may have a generally round cross sectional shape, including, e.g., a generally circular cross-sectional shape or a generally oval cross-sectional. The shape of optical fiber 18 thus configured may enhance the optical and environmental performance of the fiber. However, in some examples, forming a microstructure in accordance with this disclosure on the outer periphery of the optical fiber itself, versus on the outer coating, may be acceptable and even desirable in terms of the performance of the fiber. Thus, examples according to this disclosure are not limited to forming the microstructure on the outer coating of a fiber.

Referring again to FIG. 5, the example method includes interlocking a number of fibers with complementary microstructures to form an optical fiber assembly (406). Interlocking fibers to one another may be done manually or with the assistance of automation machinery configured to index and assemble the fibers. In one example, fibers 26 and 27 illustrated in FIG. 2B are interlocked with one another to form a one dimensional fiber assembly 44. In the example of FIG. 2B, optical fiber assembly 44 may be formed by interlocking two coated fibers 26 and 27 to one another. Optical fibers 26 and 27 may be mechanically coupled, i.e. interlocked by arranging the frustrom shaped heads of protrusions 42 on optical fiber 26 to engage the stalks of protrusions 42 on optical fiber 27 and arranging the frustrom shaped heads of protrusions 42 on optical fiber 27 to engage the stalks of protrusions 42 on optical fiber 26. Other example optical fiber assemblies are included in the example method of FIG. 5, including, e.g., the two-dimensional assemblies 50 and 54 illustrated in FIGS. 3A and 3B, respectively.

Examples according to this disclosure may provide a number of advantages for the production of optical fibers and the assembly of a number of fibers into one and two-dimensional arrays. The disclosed examples can be easily adapted to some existing manufacturing systems, thus may require very little upfront cost to begin producing optical fibers with interlocking microstructures in accordance this disclosure. For example, a micromachining apparatus (e.g., micromachining apparatus 24 shown in FIGS. 1 and 6) that is configured to form an interlocking microstructure on the outer periphery of an optical fiber (e.g., to the fiber itself or the coated fiber) may be added to an existing fiber optic drawing tower with relatively little modification to the existing system. Additionally, optical fiber assemblies according to this disclosure may be disassembled with little to no affect on the structural integrity of the fiber or the coating. In this manner, the interlocking microstructures distributed over the periphery of the fibers configure multiple optical fibers to be removably coupled to each other.

Implementation of optical fibers with interlocking microstructures according to this disclosure into a manufacturing process can also remove one step from the production fiber assemblies. For example, in some cases, optical fibers according to this disclosure may be assembled by interlocking complementary microstructures to one another without the use of any adhesive, tape, welding, or other mechanical, thermal or chemical securing mechanism in addition to the microstructures, and still produce an optical fiber array with satisfactory mechanical stability. Removing the step of applying adhesive to connect multiple optical fibers in a fiber assembly may act to reduce the time, complexity, and cost of producing such assemblies. However, adhesive or another mechanical attachment mechanism (such as the ones described above) can be used to secure interlocking optical fibers to each other in some examples.

Various examples have been described. These and other examples are within the scope of the following claims.

The invention claimed is:

1. A method comprising: drawing a first optical fiber from a preform; and forming an interlocking microstructure on an outer periphery of the first optical fiber that configures the first optical fiber to be interlocked with a second optical fiber comprising a complementary interlocking microstructure, wherein forming the interlocking microstructure on the outer periphery of the first optical fiber comprises forming a plurality of protrusions on the outer periphery of the first optical fiber, and wherein one or more of the protrusions protrudes from the outer periphery of the first optical fiber by a distance in a range from approximately 4 microns to approximately 15 microns.

2. The method of claim 1, further comprising interlocking one or more optical fibers and the first optical fiber to form an array of optical fibers.

3. The method of claim 2, wherein the array of fibers comprises at least one of a one-dimensional array or a two-dimensional array of fibers.

4. The method of claim 1, wherein forming a plurality of protrusions on the outer periphery of the first optical fiber comprises forming in a range from approximately 190,000 to approximately 210,000 protrusions per square centimeter on the outer periphery of the first optical fiber.

5. The method of claim 1, wherein at least one of the protrusions comprises at least one of a hook, loop, or barb shape.

6. The method of claim 1, wherein at least one of the protrusions comprises a stalk protruding from the outer periphery of the first optical fiber and a head protruding from the stalk, and wherein the at least one protrusion is configured such that the head of the protrusion on the first optical fiber is configured to engage a stalk of a complementary protrusion on the second optical fiber while a head of the complementary protrusion on the second optical fiber is configured to engage the stalk of the protrusion on the first optical fiber.

7. The method of claim 1, wherein forming the interlocking microstructure on the outer periphery of the first optical fiber comprises at least one of growing, cutting, or etching the interlocking microstructure on the outer periphery of the first optical fiber.

8. The method of claim 7, wherein forming the interlocking microstructure on the outer periphery of the first optical fiber comprises cutting the interlocking microstructure on the outer periphery of the first optical fiber with an excimer laser.

9. The method of claim 1, further comprising applying a coating to the first optical fiber, and wherein forming the interlocking microstructure on the outer periphery of the first optical fiber comprises forming the interlocking microstructure on an outer periphery of the coating of the first optical fiber.

10. The method of claim 9, further comprising curing the coating applied to the first optical fiber, wherein forming the interlocking microstructure on the outer periphery of the coating of the first optical fiber comprises at least one of growing, cutting, or etching the interlocking microstructure on the outer periphery of the coating of the first optical fiber after the coating has been cured.

11. An assembly comprising:
  an optical fiber comprising an interlocking microstructure formed on an outer periphery of the optical fiber that configures the optical fiber to be interlocked with another optical fiber comprising a complementary interlocking microstructure coating, wherein the interlocking microstructure of the optical fiber comprises a plurality of protrusions on the outer periphery of the optical fiber, and wherein one or more of the protrusions protrudes from the outer periphery of the optical fiber by a distance in a range from approximately 4 microns to approximately 15 microns.

12. The assembly of claim 11, wherein the optical fiber comprises a first optical fiber, the assembly further comprising a second optical fiber comprising an interlocking microstructure complementary to the interlocking microstructure of the first optical fiber, wherein the second optical fiber is interlocked with the first optical fiber to form an optical fiber assembly.

13. The assembly of claim 11, wherein the plurality of protrusions comprises from approximately 190,000 to approximately 200,000 protrusions per square centimeter on the outer periphery of the optical fiber.

14. The assembly of claim 11, wherein one or more of the protrusions comprises at least one of a hook, loop, or barb shape.

15. The assembly of claim 11, wherein at least one of the protrusions comprises a stalk protruding from the outer periphery of the optical fiber and a head protruding from the stalk, and wherein the at least one protrusion is configured such that the head of the protrusion on the optical fiber is configured to engage a stalk of a complementary protrusion on the other optical fiber while a head of the complementary protrusion on the other optical fiber is configured to engage the stalk of the protrusion on the optical fiber.

16. A system for manufacturing optical fibers, the system comprising:
  a preform from which an optical fiber is configured to be drawn; and
  a micromachining apparatus configured to form an interlocking microstructure on an outer periphery of the optical fiber that configures the optical fiber to be interlocked with another optical fiber comprising a complementary interlocking microstructure, the interlocking microstructure comprising a plurality of protrusions on the outer periphery of the optical fiber, wherein the micromachining apparatus is configured to form one or more of the protrusions protruding from the outer periphery of the optical fiber by a distance in a range from approximately 4 microns to approximately 15 microns.

* * * * *